US006692344B2

(12) United States Patent
Burke

(10) Patent No.: US 6,692,344 B2
(45) Date of Patent: *Feb. 17, 2004

(54) METHOD AND APPARATUS FOR CLEANING ANIMAL INTESTINES

(75) Inventor: Thomas J. Burke, Oldwick, NJ (US)

(73) Assignee: M & P Chitlin Co., Inc., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,678

(22) Filed: Jul. 2, 2001

(65) Prior Publication Data

US 2001/0036806 A1 Nov. 1, 2001

Related U.S. Application Data

(63) Continuation of application No. 09/222,628, filed on Dec. 29, 1998, now Pat. No. 6,254,470, which is a continuation of application No. 08/931,797, filed on Sep. 16, 1997, now Pat. No. 5,855,506.

(51) Int. Cl.[7] .............................................. A22C 17/14
(52) U.S. Cl. ....................................................... 452/123
(58) Field of Search ................................... 452/123, 173

(56) References Cited

U.S. PATENT DOCUMENTS

| 2,697,245 | A | * | 12/1954 | Clemens et al. | ............ | 452/123 |
|---|---|---|---|---|---|---|
| 2,726,421 | A | * | 12/1955 | Strickler | ...................... | 452/123 |
| 2,791,800 | A | * | 5/1957 | Lindstrom | ................... | 452/123 |
| 3,290,722 | A | * | 12/1966 | Norks | ......................... | 452/123 |
| 3,509,593 | A | * | 5/1970 | De Moss | ..................... | 452/123 |
| 3,611,477 | A | * | 10/1971 | Walter et al. | ................ | 452/123 |
| 3,958,304 | A | * | 5/1976 | Barbee | ........................ | 452/123 |
| 5,820,453 | A | * | 10/1998 | Burke | ......................... | 452/123 |

* cited by examiner

Primary Examiner—Thomas Price
(74) Attorney, Agent, or Firm—Frommer Lawrence & Haug LLP; Matthew K. Ryan

(57) ABSTRACT

An apparatus and method for cleaning fecal matter from the interior of an extracted animal intestine is disclosed. The apparatus has a horizontal tube member for supporting an intestine; support members attached to opposite sides of the tube member for supporting the side portions of a slit intestine; a transporter mounted below and adjacent to the bottom side of the tube for moving intestines from adjacent the distal end of the tube towards the proximal end; a cutting blade mounted above the tube member; and a plurality of nozzles arranged at transversely opposite sides of the tube member for directing fluid downwardly and about the top side of the pipe member. A method for cleaning animal intestines using such an apparatus is also disclosed.

15 Claims, 2 Drawing Sheets

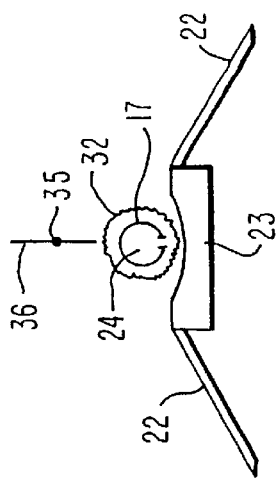
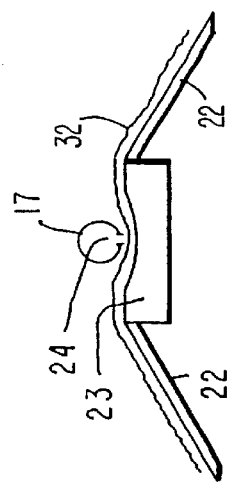
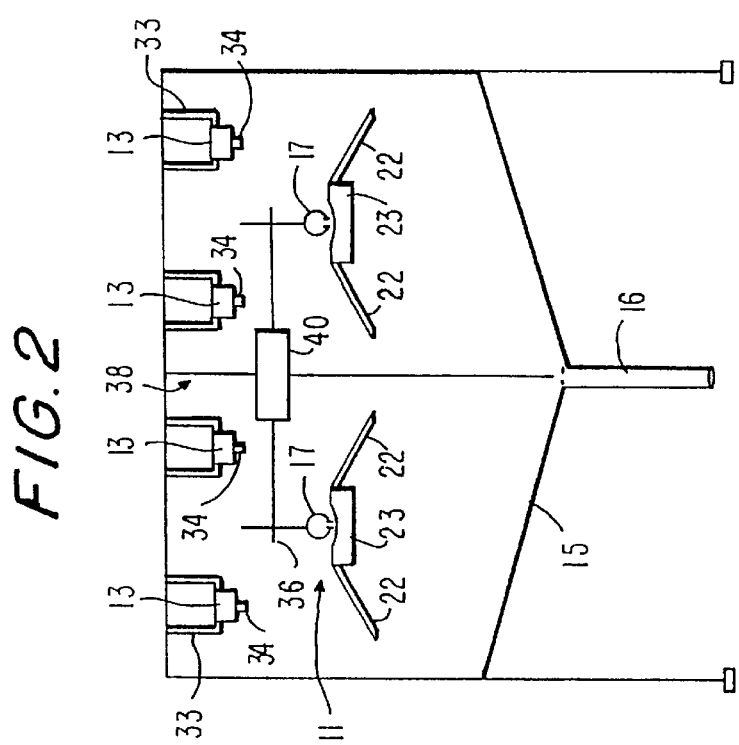

METHOD AND APPARATUS FOR CLEANING ANIMAL INTESTINES

This appln is a con of Ser. No. 09/222,628 Dec. 12, 1998 U. S. Pat. No. 6,254,470 which is a con of Ser. No. 08/931,797 Sep. 16, 1997 U.S. Pat. No. 5,855,506.

FIELD OF THE INVENTION

The present invention relates to an apparatus and method for cleaning the intestines of animals, particularly the extracted intestines of hogs, to produce a food product known as chitterlings.

BACKGROUND OF THE INVENTION

Animal intestine is a tubular element which extends from the stomach to the anus. The intestines of various animals have been used as a food product. The intestines of hogs extend some 16 feet to 18 feet in length, and in their natural state are of sinuous configuration, with connective tissue, fat and glands on the exterior. Food is received from the stomach and passed along the intestines as fecal matter. The term commonly applied to hog intestines which have been prepared as a food product is the word "chitterling," and this word and the word intestines are used interchangeably herein. For use as food, the chitterling must be cleaned. In preparation for cleaning, it is unstrung by cutting connective tissue between different portions of the intestine.

A machine used for cleaning chitterlings is known as the Strickler machine, such as is shown in U.S. Pat. Nos. 2,701,836 and 2,726,421 to Strickler, and in U.S. Pat. No. 3,509,593 to DeMoss. The chitterling is first placed on the end of a linearly extending pipe, which has a nozzle which directs water forwardly into the chitterlings and engages and removes some of the fecal matter, an appreciable amount of the fecal matter remaining in the intestine. The tubular chitterling is passed over the pipe, and a rotary cutting knife revolving on an axis perpendicular to the pipe slices the chitterling longitudinally from below. The bottom-slit chitterlings have some fecal matter adhering to them, and also have some glands, fat and connective tissues attached to them. After being slit, the chitterlings are placed on a spreading carrier and are sprayed with water from below and above for the purpose of removing fecal matter, but much of the fecal matter removed by the spray falls back on, and readheres to, the top (external) surface of the slit chitterlings.

In commercial operations, the chitterlings are next delivered to an agitating washer for further cleaning. In the agitating washer, some of the remaining fecal matter, glands, connective tissue and fat are removed by agitative washing and centrifugal force. But some of the fecal matter which is thus disassociated from the interior surface of the chitterling adheres to the exterior surface of the chitterlings and to connective tissue, fat, glands, etc. on the exterior surface.

The chitterlings are packaged and sold at this stage, in many operations. But these chitterlings have a significant amount of fecal matter, as well as some glands and connective tissue. The purchaser must spend a substantial amount of time in inspecting and manually picking out fecal matter, and fat, glands and connective tissue.

For greater cleanliness of the chitterlings, they may be passed through an inspection and hand cleaning process in which the chitterlings are individually inspected and substantially all fecal matter, together with connective tissue and fat, are removed. While this additional manual processing step is effective in removing a great amount of undesirable material from the chitterlings, it is an expensive, labor-intensive operation; the costs for these chitterlings which are substantially cleaner than those sold after the centrifugal washing is significantly higher.

The above-described processes and apparatus, which are commercially used in the United States, have a number of deficiencies. Among them are that the chitterlings which are sold after passing through the centrifugal washing machine have a substantial amount of fecal matter remaining, which requires the consumer to remove by careful, time-consuming and labor-intensive hand operations. It has now been recognized that in the above described processing apparatus and method, after the chitterling has been subjected to the initial internal water wash, and is then longitudinally slit from below and washed, there remains on the chitterling a substantial amount of fecal matter and that further washing in the agitating washing machine causes the fecal matter to be dis-associated from the smooth, non-adherent interior surface of the chitterlings and enter into the water in the agitating washer machine. Due to the movement of the chitterling and of the water, the dis-associated fecal material moves to and adheres to the exterior surface of the chitterling which is adherent to the fecal matter. Hence, it has been noted that the initial internal washing does not remove the fecal matter from the chitterling and that the further spray washing and agitating washing result in fecal matter engaging and adhering to the exterior surface of the chitterling. In the commercial operation using the above-described machine, approximately 6 intestines per minute are partially cleaned, with a water consumption of approximately 40 gallons per minute. In an eight hour shift, approximately 400,000 gallons of water are used to clean about 16,000 chitterlings, which still have substantial fecal matter remaining.

In addition, the processing of chitterlings by using the machine as above-described requires one or more attendants to manually retrieve a chitterling from a supply of them, place an end of the chitterling over the end of the water tube having the nozzle, and to push the chitterling along the tube. This requires repetitive motions, and subjects the worker to the risk of injury due to a repetition of the same motion many times during the working day. Moreover, the process is time- and labor-intensive and thus costly.

OBJECTS OF THE INVENTION

Among the objects of the present invention are to provide a method and apparatus for cleaning extracted animal intestines which will produce clean product without inspection and hand cleaning.

Another object of the present invention is the provision of such a method and apparatus for cleaning animal intestines which will have substantially reduced water consumption, while achieving a substantially higher level of cleanliness of the finished product without hand cleaning.

It is still a further object of the present invention to provide a method and apparatus for cleaning extracted animal intestines in which there is a reduced hazard to the health of the workers.

Yet another object of the present invention is to provide a method and apparatus for cleaning animal intestines which results in a lower cost of production.

SUMMARY OF THE INVENTION

This invention relates to an apparatus for cleaning animal intestines comprising a horizontal tube member for supporting an intestine; support members attached to opposite sides of said tube member for supporting the side portions of a slit intestine; a transporter mounted below and adjacent to the bottom side of said tube for moving intestines from adjacent the distal end of said tube towards the proximal end; a cutting blade mounted above said tube member; and a plurality of nozzles arranged at transversely opposite sides of said tube member for directing fluid downwardly and about the top side of said pipe member.

This invention also relates to an apparatus for cleaning animal intestines, comprising a frame structure; intestine supporting means carried and extended longitudinally of said frame structure; a vertically extended intestine slitting cutter unit supported on said frame structure above said intestine supporting means; means on said frame structure for moving an intestine slit by said cutter unit along said supporting means from the front end of said frame structure toward the rear end thereof, said intestine moving means being engageable with the fatty side of the intestine at the leading end thereof prior to the slitting of the opposite side of the intestine by the cutter unit to provide for the release of the intestine from said guide means and the support of the fatty side on said intestine supporting means; and means on said frame structure for directing streams of fluid against opposite side surfaces of the slit intestine being moved along said supporting means by said moving means.

This invention also relates to a method for cleaning animal intestines comprising the steps of placing an animal intestine having fecal matter therein over a tube; transporting the intestine along the tube; slitting open the intestine longitudinally along its top surface; spraying the slit chitterlings with water; and passing the intestine along and off the tube.

BRIEF DESCRIPTION OF THE FIGURES

FIG. 2 is a sectional view taken on the line 2—2 of FIG. 1.

FIG. 3 is an enlarged sectional view taken on the line 3—3 of FIG. 1.

FIG. 4 is an enlarged sectional view taken on the line 4—4 of FIG. 1.

DETAILED DESCRIPTION OF PREFERRED EMBODIMENT

Figure 1:
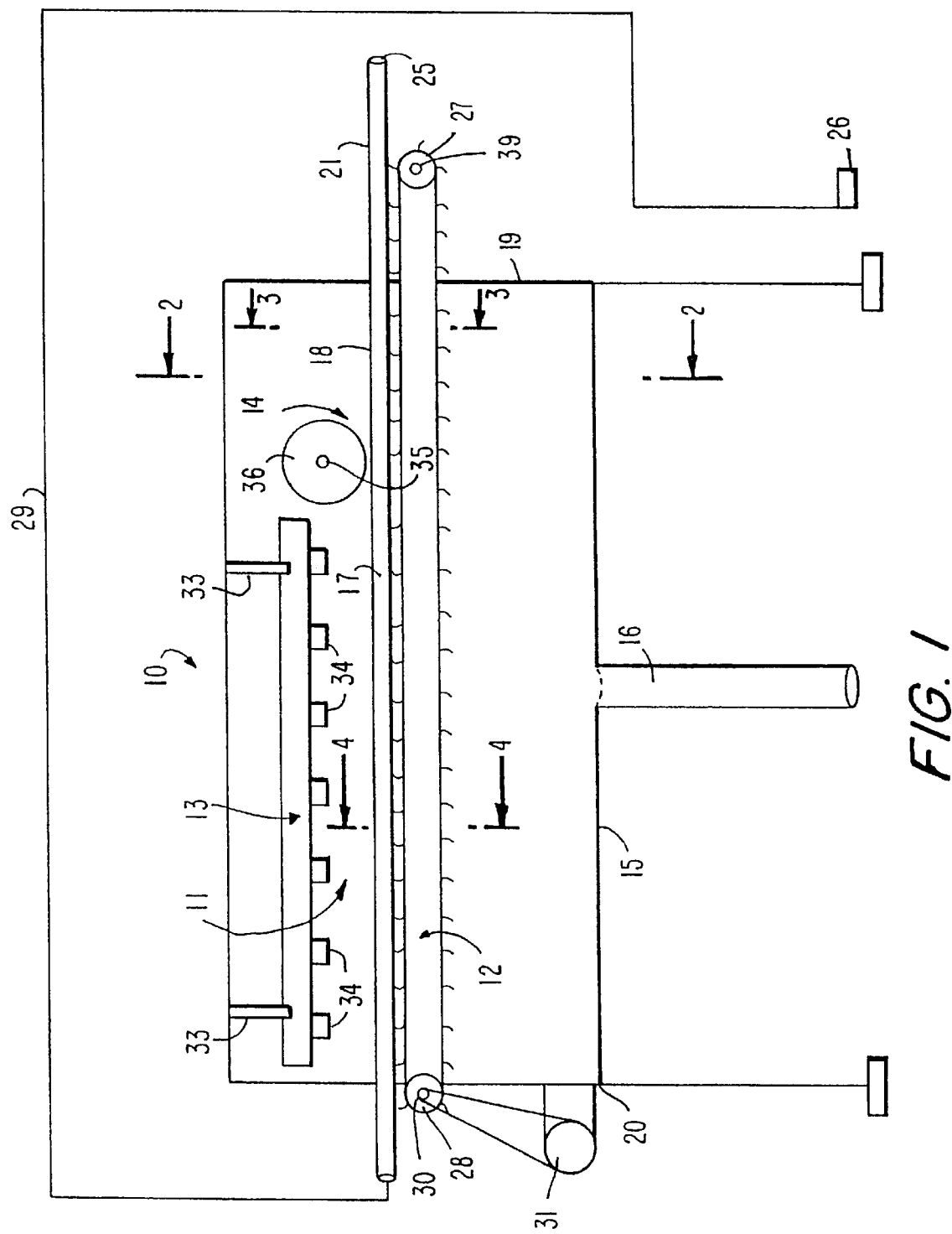
FIG. 1 is a side elevational view of an apparatus in accordance with the present invention, with certain parts broken away.

Referring now to the drawings wherein like or corresponding reference numerals are used for like or corresponding parts throughout the several views, there is in a preferred embodiment, a main frame or housing structure, designated generally as 10, as shown in FIG. 1, and a pair of transversely spaced intestine supporting and washing units 11 (only one of which is shown in FIG. 1) that are extended longitudinally of the housing 10. Each unit 11 includes an endless conveyor or transporter assembly 12 for moving an intestine, tubular spray members 13 for washing the inside surface of an intestine as it is moved by conveyor or transporter assembly 12, and a rotary cutter unit 14 for longitudinally slitting the top surface of an intestine.

At the bottom of the housing assembly 10 there is a bottom wall 15 having a drain 16. A trough or intestine receiving member optionally may be extended forwardly from the front end 19 of housing structure 10 to form an extension of the housing.

Since the pair of intestine supporting and washing units 11 are similar in construction and operation only one of such units will be described in detail, with like numerals being applied to corresponding parts. As shown in FIG. 2, the two units 11 may be separated by a dividing member 38.

An intestine supporting and washing unit 11 includes a pipe or fluid carrying member 17 extended longitudinally of and within the housing 10. The pipe member 17 has a wash section 18 extended between the front end 19 and rear end 20 of housing structure 10, and a front or intestine feed section 21 that projects forwardly from the front end 19 of housing structure 10.

As shown in FIG. 2, positioned adjacent to and at opposite sides of the pipe member 17 are a pair of combination support and spreader assemblies 22 which extend laterally downwardly in opposite directions from the wash section.

The pipe 17 is formed, over the length of the wash section, in its lower wall with a plurality of transverse discharge orifices 24 which are spaced longitudinally of the wash section 18 to direct fluid in directions generally downwardly and laterally from the wash section 18. A single discharge orifice 25 is provided in the terminal end of the feed section 21 of the pipe 17. The flow of water through pipe 17 may be controlled by a foot-operated valve 26 through water line 29. The temperature of the water used to clean the intestines is preferably about 90° F.

The transporter assembly 12 is provided below the pipe 17. The transporter 12 comprises rollers 27 and 28, and a belt or chain 23. The transporter 12 also comprises a shaft 30 supporting rear roller 28 and a shaft 39 supporting front roller 27.

The belt 23 is operated by an electric motor 31 carried on the rear end frame structure 20 in a driving relation with the support structure 30.

Positioned above and at opposite sides of pipe 17 is a pair of tubular fluid discharge or spray members 13 which are suspended by brackets 33 from the housing 10. Each pair of tubular spray members 13 has a common inlet connection which supplies water under pressure through downwardly directed nozzles 34 spaced longitudinally in the bottom sides thereof.

Optionally, air may be combined with water in spray members 13 to atomize the water, thus producing similar results using decreased water.

Arranged above the transporter assembly 12 and below the spray members 13 is the rotary cutting unit 14 mounted on dividing member 38, which includes a shaft 35 that carries a pair of rotary cutting blades 36, and a blade housing 37 for each blade 36. The blade housing, which is preferably made of plastic, prevents blade damage and ensures longer blade life. Adjustment screws are used to raise or lower the blade. As shown in FIG. 3, each blade 36 is positioned in a vertical plane which is common to the corresponding belt 23 and fluid carrying pipe 17. The bottom edge of blade 36 is located in the center of the top side of the forward end of wash section 18 of the pipe 17. A gear box and hydraulic motor 40 mounted on dividing member 38 turn each shaft 35, and the blade 36 revolves thereon, cutting the intestine. Alternatively, the cutting unit may comprise high pressure water jet cutting instead of a blade and blade housing.

In use the machine is adapted to clean intestines of varying sizes and in one embodiment of the invention the pipe 17 has a diameter of about one and one-half inches and will effectively carry intestines having diameters, when filled, of from three to five inches, namely the large intestine of a hog. The lead end of the intestine 32 to be cleaned is initially positioned on the feed section 21 of the fluid carrying pipe 17.

As the intestine approaches blade 36 the lead end thereof is picked up by the belt 23 of transporter assembly 12. The top side of the intestine 32 is then moved against the blade 36 by the action of the belt 23, and the intestine is continuously slit longitudinally thereof along its top side. On being cut or slit, the intestine falls open, with the inside surface facing up, and the outside surface facing down and resting against the spreader assemblies 22. The contents remaining within the intestine drop downwardly out of the intestine and into the drain 16.

As the intestine is engaged by blade 36 the bottom side of the intestine passes between the pipe 17 and the feeding belt 23 with the belt acting to automatically feed the intestine through the machine. In this feeding action the intestine 32, as appears in FIG. 4, is moved to what might be termed a full spread position wherein the intestine is held in place at its central portion between the pipe 17 and the belt 23, and supported at its side portions on the upper surfaces of the spreader assemblies 22.

As the leading end of the intestine 32 passes under the blade 36 and is spread out on the spreader assembly, the upper (inner) surface of the spread out intestine is concurrently acted upon by the high-pressure jets of water discharged from the orifices 24 of the pipe 17 and from the spray nozzles 34. The intermixing of the water from the nozzles 34 and orifices 24 effectively removes all particles of fecal matter from the inner surface of the slit intestine without readhering them to the outer surface of the intestine, because the outer surface is shielded by resting on the spreader assemblies 22.

Simultaneously with the washing action on the inner surface of the intestine 32 by the water discharge from the pipe 17, the upper (inner) surface of the intestine is subjected to the washing and cleaning action of the jets of water directed downwardly from the spray members 13 through the discharge openings 34 therein which wash over the exposed inner surface of the intestine.

As the intestine 32 passes off the rear end of the belt 23, it may drop into an optional receiving tray (not shown) extended rearwardly from the frame structure 10.

The belt 23 may be made of any suitable material. Commercial machines typically use metal (e.g. stainless steel) belts, and such belts are suitable for use in the present invention as well. However, a common problem with metal belts is that as the belt passes around the rear roller, the intestine sticks to the belt and is stretched around the roller instead of dropping off.

It has been surprisingly found that the problem of intestines stretching and sticking to the belt can be solved by making a belt out of plastic, e.g. ultra high molecular weight plastic such as that used for cutting boards. Preferably each link of the plastic chain is shaped like a trough in which the intestine rests. Such plastic belts, in addition to being less likely to stretch or adhere the intestines, are inexpensive, easier to clean, and easier to repair and maintain.

After intestines have been internally cleaned in the apparatus claimed herein, they may be cut into a short sections of approximately 15–18 inches in length. These intestine sections may then be introduced into a commercially available agitating washing and centrifuging machine, where the intestine sections are agitated to further wash and disassociate any small amount of remaining fecal matter, after which there is a centrifuge action which removes water and any fecal matter. The cleaned intestine sections are then removed from the washing and centrifuging machine and are packaged.

With the present apparatus, there is greatly reduced utilization of water. It is estimated that the water consumption for an eight hour shift producing some 16,000 clean chitterlings is approximately 100,000 gallons, considerably less than is consumed using the standard commercial apparatus and method. The chitterlings cleaned by the apparatus herein disclosed are substantially free of fecal matter, without resort to hand removal of fecal matter particles, and are substantially cleaner than the chitterlings produced by the known apparatuses and methods. In addition, with the apparatus and method of the present invention, there is less risk of injury to personnel because of repetitive motion injury and the production costs are significantly decreased.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. An apparatus for cleaning animal intestines comprising:
   a. a horizontal member for supporting an intestine;
   b. a transporter, vertically disposed below said horizontal member for transporting said intestine;
   c. a cutting blade for slicing said intestine;
   d. at least one support member attached to said transporter for supporting a sliced intestine, said support member contacting an outer surface of a sliced intestine; and
   e. at least one nozzle for directing fluid downwardly on an exposed inner surface of said intestine.

2. The apparatus of claim 1, wherein said transporter comprises a plastic belt.

3. The apparatus of claim 1, wherein said horizontal member has a plurality of discharge openings for directing fluid therefrom.

4. The apparatus of claim 3, further comprising means to control the flow of water through said horizontal member.

5. The apparatus of claim 4 wherein said means to control the flow of water through said horizontal member is a foot operated valve.

6. The apparatus of claim 1, further comprising a housing.

7. The apparatus of claim 1, wherein said cutting blade is located within a blade housing.

8. The apparatus of claim 1, further comprising a receiving table for receiving cleaned intestines which have been discharged from said horizontal member.

9. An apparatus for cleaning animal intestines comprising:
   a. a frame structure;
   b. a first intestine supporting means extended longitudinally of said frame structure;
   c. an intestine cutting unit supported on said frame structure;
   d. a second intestine supporting means for supporting an intestine sliced by said cutting unit, said second intestine supporting means engageable with an outer side of said intestine;
   e. means on said frame structure for moving an intestine along said first and second supporting means from the front end of said frame structure toward the rear end thereof, said intestine moving means being engageable with the outer side of the intestine; and
   f. means on said frame structure for directing streams of fluid downwardly against an inner side surface of the slit intestine.

10. The apparatus of claim 9, wherein said intestine moving means comprises a plastic belt.

11. The apparatus of claim 9, said cutting unit comprising a blade and a blade housing.

12. The apparatus of claim 9, said cutting unit comprising a high pressure water jet.

13. A method for cleaning animal intestines comprising the steps of:
   a. placing an animal intestine over a horizontal member;
   b. transporting the intestine along the horizontal member;
   c. slitting open the intestine;
   d. engaging by means of a support an outer surface of a slit intestine to expose only an interior side of the intestine;
   e. transporting the supported slit intestine;
   f. spraying the exposed interior side of the slit intestine with fluid; and
   g. passing the intestine along and off of the support.

14. The method of clam 13, further comprising the step of discharging water from the horizontal member to break up and remove fecal matter from the intestine.

15. The method of claim 13, further comprising the steps of retrieving intestines passed off the support and agitatively washing said intestines.

* * * * *